Figure 1:
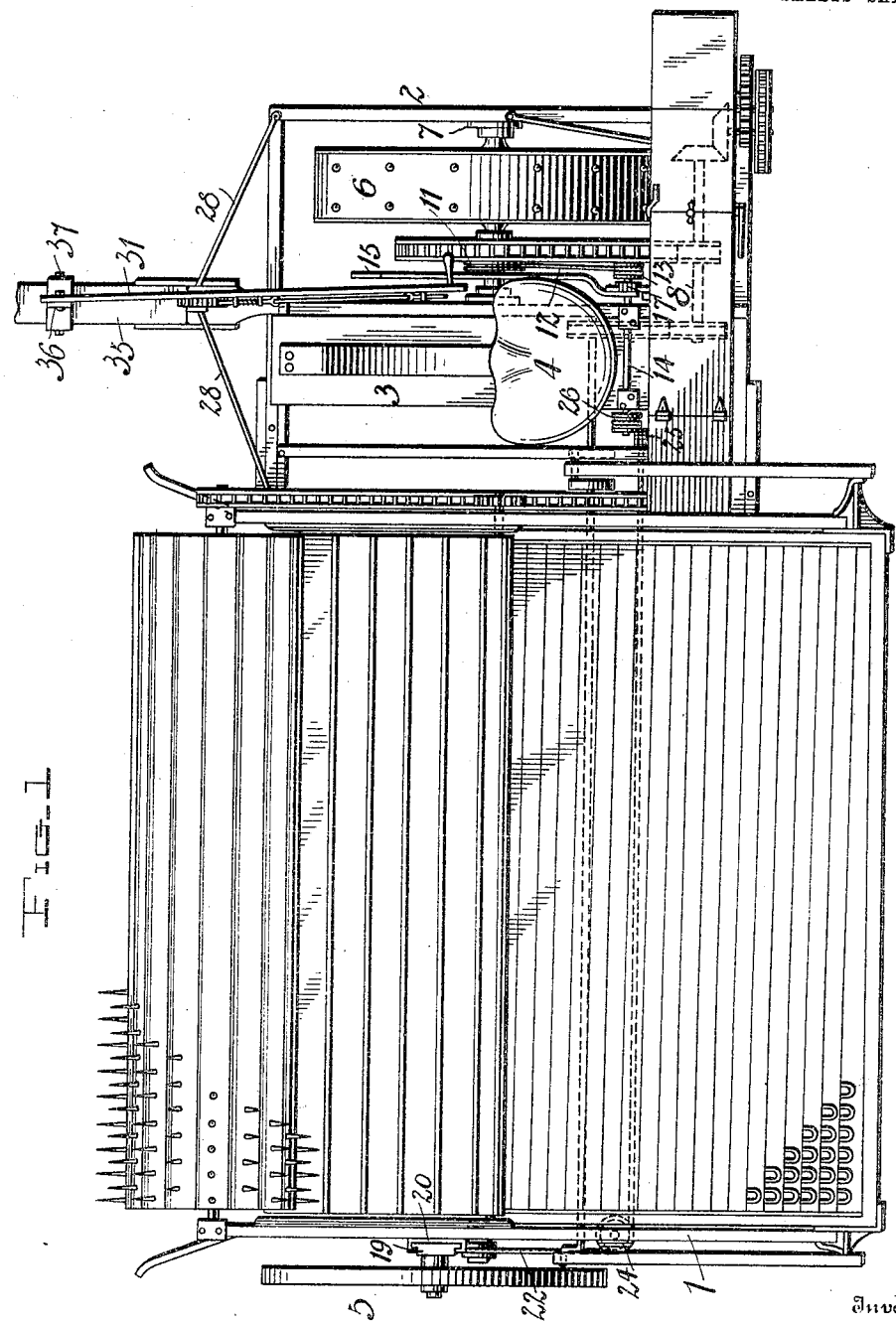

No. 813,349. PATENTED FEB. 20, 1906.
T. J. CAMPBELL.
PLATFORM ADJUSTING MEANS FOR SEED HARVESTERS.
APPLICATION FILED JULY 19, 1904.

3 SHEETS—SHEET 1.

Witnesses

Inventor
Thomas J. Campbell
By
his Attorneys

No. 813,349. PATENTED FEB. 20, 1906.
T. J. CAMPBELL.
PLATFORM ADJUSTING MEANS FOR SEED HARVESTERS.
APPLICATION FILED JULY 19, 1904.
3 SHEETS—SHEET 2.
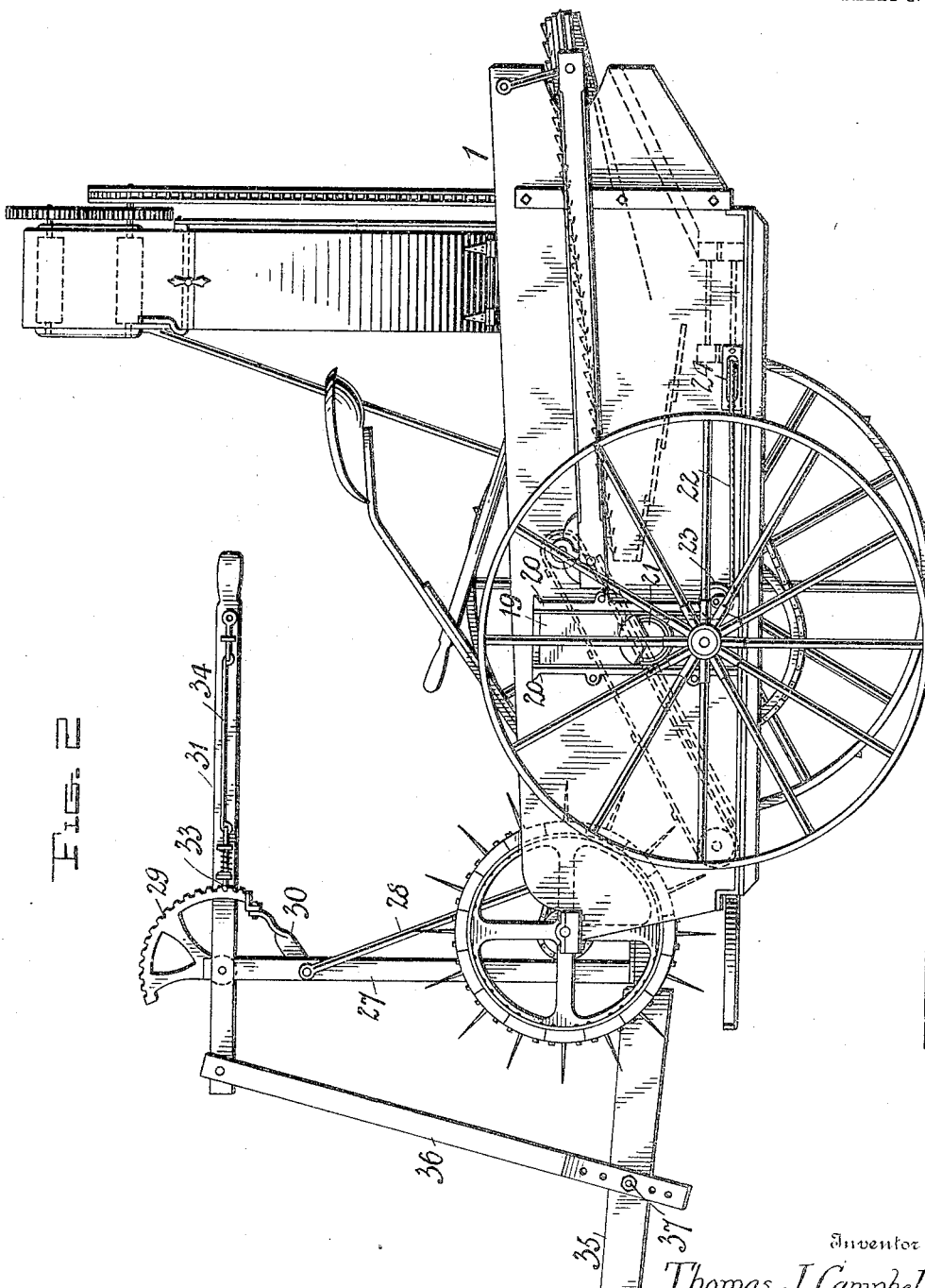
Witnesses
Inventor
Thomas J. Campbell
By Dudley, Browne & Norton
his Attorneys

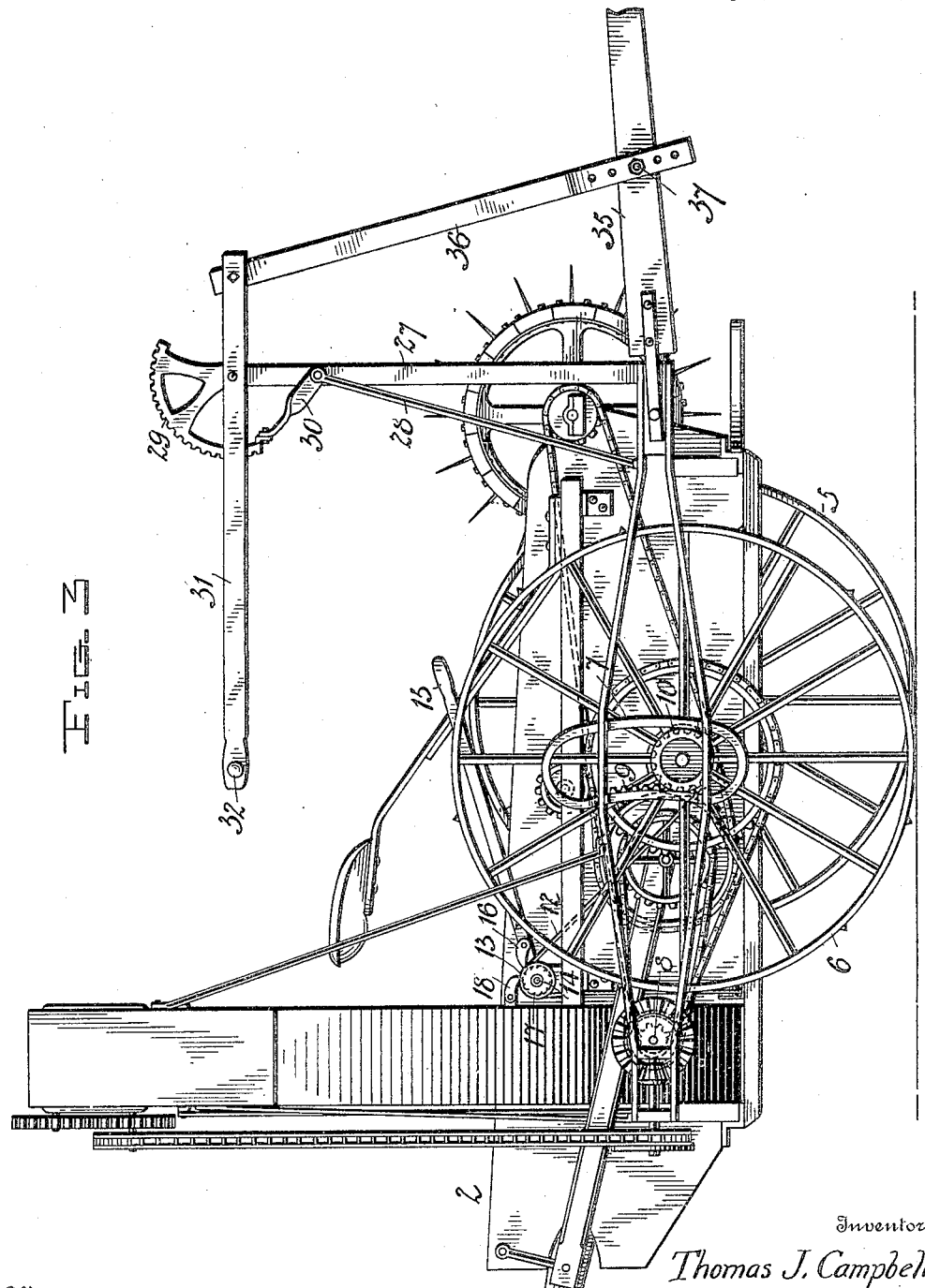

UNITED STATES PATENT OFFICE.

THOMAS J. CAMPBELL, OF LATHROP, MISSOURI.

PLATFORM-ADJUSTING MEANS FOR SEED-HARVESTERS.

No. 813,349.  Specification of Letters Patent.  Patented Feb. 20, 1906.

Original application filed June 20, 1904, Serial No. 213,359. Divided and this application filed July 19, 1904. Serial No. 217,214.

*To all whom it may concern:*

Be it known that I, THOMAS J. CAMPBELL, a citizen of the United States, residing at Lathrop, in the county of Clinton and State of Missouri, have invented certain new and useful Improvements in Platform-Adjusting Means for Seed-Harvesters; and I do hereby declare the following to be a full, clear, and exact description of the invention, such as will enable others skilled in the art to which it appertains to make and use the same.

This invention, which relates to seed-harvesters of the construction shown, described, and claimed in my application for patent filed June 20, 1904, Serial No. 213,359, and forms a divisional part of said application, contemplates an improved means for adjusting the platform relative to the height of growth of material.

The nature of the improved adjusting means will be readily comprehended, reference being had to the following detailed description and to the accompanying drawings, illustrating the means in its preferred form of embodiment, it being understood that various modifications may be made therein without departing from the spirit of invention defined by the concluding claim.

In the drawings, Figure 1 is a top plan view of a seed-harvester equipped with platform-adjusting means embodying my invention. Fig. 2 is a side elevation viewed from the left of the harvester. Fig. 3 is a right-hand side elevation.

Referring to the drawings by numerals, 1 designates the main frame of the machine, and 2 is a frame extending transversely from the main frame and on which is a platform 3, supporting a driver's seat 4.

The machine is supported by a wheel 5 at the left-hand side of the main frame and by a wheel 6 at the right-hand side of the extension-frame, said latter wheel being employed as the driver for the moving parts. The main and extension frames and the parts carried thereby are at the right-hand side vertically adjustable relatively to the height of the grass or other seed material by means constructed and operating preferably as follows: Fixed to the extension-frame is a casting 7, having a slot the walls of which are curved to conform to an arc drawn from a radius of which the axis of a rear driven shaft 8 is the center, one of the slot-walls being provided with a series of teeth or rack 9, engaged by a gear-wheel 10, fixed to a sleeve loose on the wheel-axle. Fixed to said sleeve is a sheave 11, to which is attached one end of a cable 12, the other end being fastened to a drum 13 on a shaft 14. The drum is revolved by a hand-lever 15, pivoted on the shaft and carrying a pawl 16, which is in engagement with the teeth of a ratchet-wheel 17, keyed on said shaft. The cable before being fastened to the sheave 11 is passed partly around the latter, and by revolving the drum the gear-wheel 10 is, through the cable connection, partially revolved to effect the raising of the frame and parts carried thereby by the engagement of the gear-wheel with the curved rack. The adjustment is maintained preferably by the engagement of a lock-pawl 18 with the ratchet-wheel 17. The described adjusting means is located at the right-hand side of the machine or adjacent to the drive-wheel 6 and is more clearly shown in Fig. 3. In said figure the machine is shown in its raised position, the gear-wheel 10 engaging the lowermost teeth of the rack 9.

In Fig. 2 more particularly is shown the means of adjustment at the wheel 5 or left-hand side of the machine. Extending from the axle of said wheel is a bracket 19, slidably confined between guides 20 20 on the outer side of the main frame, and on said bracket is a sheave 21, around which passes a rope or cable 22, attached at one end to the frame. From the sheave 21 the rope or cable passes around an idler-sheave 23 on the frame side, thence around a horizontal idler-sheave 24, journaled in an opening in said side, thence to and around a vertical idler-sheave 25 at the opposite side of the frame, and finally around a drum 26 on the shaft 14. In the operation of the adjusting means the drums 13 and 26 are simultaneously revolved, and the machine is by the described devices raised to the desired height and there maintained by the locking-pawl.

Vertical adjustment of the machine at its front is obtained by the following means: Erected at the front end of the extension-frame is a post 27, braced by rods 28 28 and carrying at its upper end a segmental rack 29, braced by a rod 30, secured thereto and to the post. Pivoted to the upper end of the post is a lever 31, having at one end a handle 32 and carrying a spring-pressed pawl 33, normally engaging the rack 29. Suitable hand means, such as the slidable rod 34, on the lever is employed to disengage the pawl from the rack. The draft-tongue 35 is pivotally attached to the extension-frame, and adjustably connecting said tongue and the opposite end of the lever 31 is a rod 36, the lower end of which is bifurcated to receive the tongue and has a series of holes for the fastening-bolt 37, said holes permitting the adjustment between the lever and tongue. Movement of the lever 31 after disengagement of the pawl and rack obtains the desired vertical adjustment of the front of the machine, the adjusted position being maintained by the reëngagement of the pawl and rack.

I claim as my invention—

In a machine of the class described, a frame, supporting-wheels at the sides of the frame, means for vertically adjusting the frame at one side, consisting of a curved rack on the frame, a gear-wheel loose on the supporting-wheel axle and meshing with said rack, a sheave rotatable with said gear-wheel, a shaft having means for rotating it, a drum fixed on said shaft, a cable partly wound at its ends respectively on said drum and on said sheave, means for simultaneously vertically adjusting the frame at its other side, consisting of a second drum on said shaft, vertical parallel guides on the frame, a bracket movable in said guides and carrying the axle for the other supporting-wheel, a sheave on the bracket above said axle, idler-sheaves on the frame, a cable attached at its ends respectively to the frame and last-named drum and intermediately passed around the bracket-sheave and idler-sheaves, and means independent of the aforesaid means for vertically adjusting the frame at its front.

In testimony whereof I affix my signature in presence of two witnesses.

THOMAS J. CAMPBELL.

Witnesses:
ABRAHAM L. REHARD,
C. M. MORSE.